Sept. 21, 1971 K. W. HALLDEN 3,606,813
ROTARY SHEAR
Original Filed Nov. 25, 1968 2 Sheets-Sheet 1
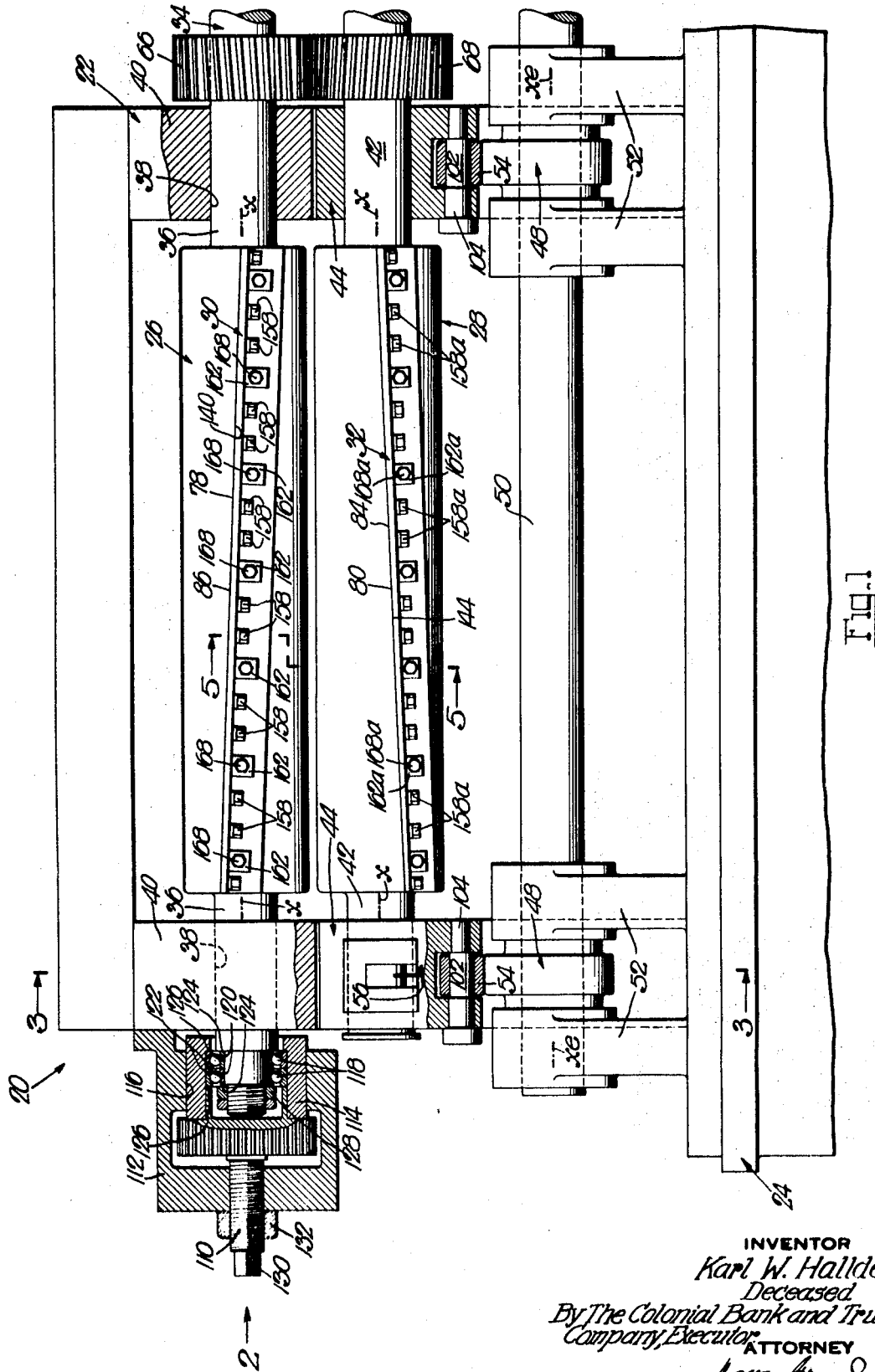
INVENTOR
Karl W. Hallden,
Deceased
By The Colonial Bank and Trust
Company, Executor
ATTORNEY

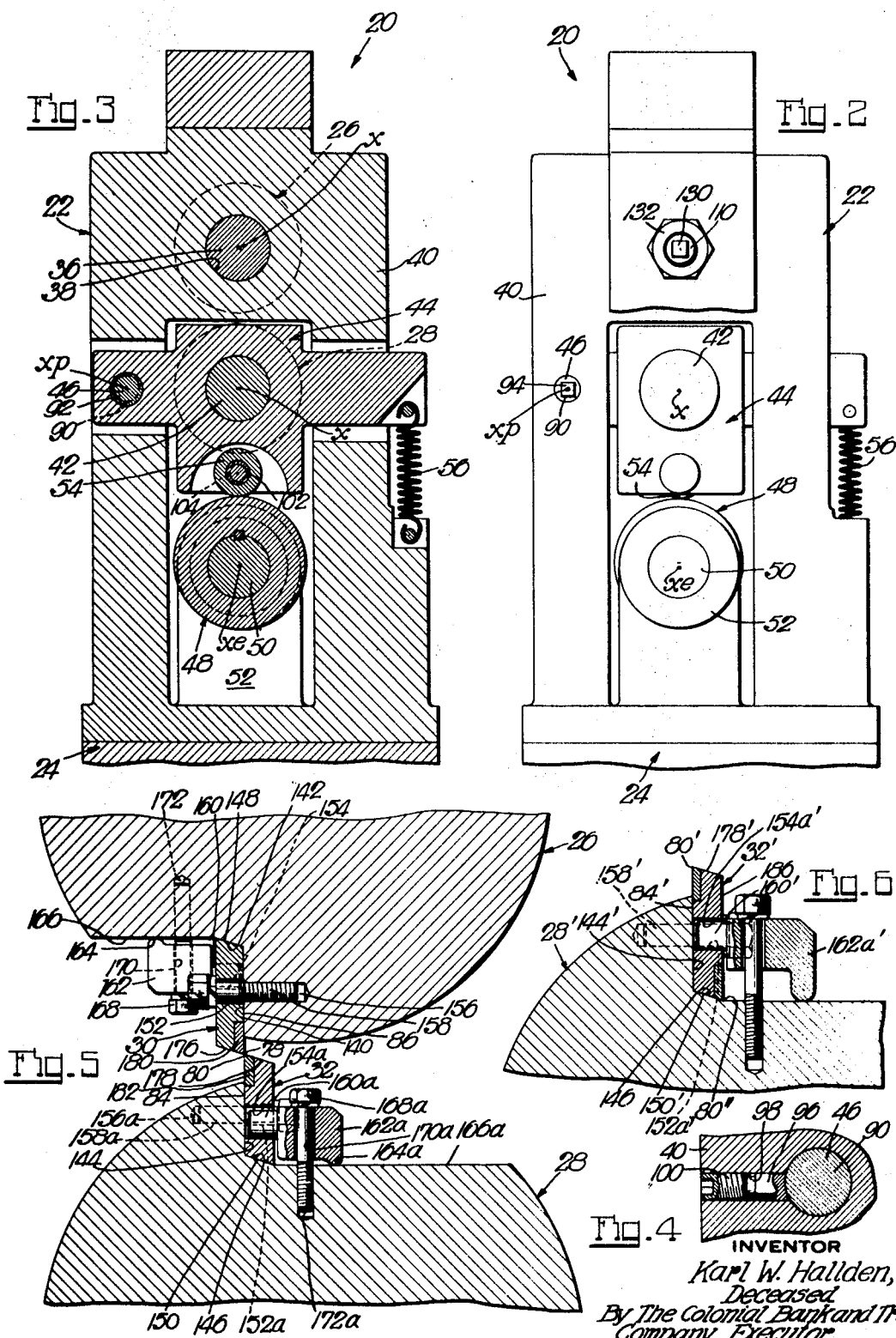

United States Patent Office 3,606,813
Patented Sept. 21, 1971

3,606,813
ROTARY SHEAR
Karl W. Hallden, deceased, late of Thomaston, Conn., by The Colonial Bank and Trust Company, executor, Waterbury, Conn., assignor to The Hallden Machine Company, Thomaston, Conn.
Original application Nov. 25, 1968, Ser. No. 778,593. Divided and this application July 16, 1970, Ser. No. 55,371
Int. Cl. B26d 1/40
U.S. Cl. 83—672                                   6 Claims

ABSTRACT OF THE DISCLOSURE

Companion drums of a rotary shear have machined shoulders and bottom rests slanting from the shoulders, and shear blades for the drums have each a front face and parallel slanting top and bottom surfaces and a cutting edge at the junction of the front face and top surface, with each blade resting with its bottom surface flush on the bottom rest of a drum when its front face is located on the shoulder of the same drum.

---

This is a division of application Ser. No. 778,593, filed Nov. 25, 1968.

This invention relates to rotary shears, and more especially, though not exclusively, to rotary shears with helical shear blades.

It is among the objects of the present invention to provide a rotary shear with helical shear blades which not only must cut metal stock entirely satisfactorily, but their cutting edges must remain sharp much longer, and hence require resharpening far less frequently, than straight blades performing on the same metal stock, yet the cost of the shear is no more than that of a metal-cutting shear with straight companion blades. Such a shear is far superior to a metal-cutting shear with straight blades, not only because the blades last far longer before requiring resharpening, but for the first time the important advantages of progressive shear action of helical blades are realized in a metal cutting shear.

It is another object of the present invention to obviate any need for shear-blade or shear-drum adjustment for accurate cutting coordination of the blades after each resharpening of either blade and remounting it on its drum. This is achieved by providing each drum with a machined helical shoulder and a machined bottom rest slanting from the shoulder, and providing each blade with a front face and slanting parallel top and bottom surfaces, and a cutting edge at the junction of the front face and top surface, and mounting each blade with its front face on a shoulder of a drum and with its slanting bottom surface on the slanting bottom rest of the same drum, with the front face and bottom surface of the blade being then in form-fit with the shoulder and bottom rest on the drum.

It is a further object of the present invention to form each shear blade cross-sectionally as a parallelogram, with parallel front and rear faces and parallel slanting top and bottom surfaces, and to provide each shear blade with two shear edges at the junction of the front face and top surface and at the junction of the rear face and bottom surface, whereby either cutting edge of a blade may be used for cutting on mounting the same in either of two reversed dispositions on the aforementioned shoulder and bottom rest of its drum.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view, partly in section, of a rotary shear embodying the present invention;

FIG. 2 is an end view of the shear as seen in the direction of arrow 2 in FIG. 1;

FIG. 3 is a section through the shear taken substantially on the line 3—3 of FIG. 1;

FIG. 4 is an enlarged fragmentary section through certain detail structure of the shear;

FIG. 5 is an enlarged fragmentary section through the shear taken substantially on the line 5—5 of FIG. 1; and FIG. 6 is a fragmentary section similar to FIG. 5, but showing a modification in the shear construction.

Referring to the drawings, and more particularly to FIGS. 1 to 3 thereof, the reference numeral 20 designates a rotary shear having a shear frame 22 on a base or bed 24, upper and lower companion shear drums 26 and 28 with companion shear blades 30 and 32, and a shear drive 34. With the shear being in this example of miscut type, the upper drum 26 is with its shaft 36 supported in bearing apertures 38 in spaced uprights 40 of the frame 22, while the lower drum 28 is mounted for movement to and from cut relation with the upper drum 26. The lower drum 28 is to this end supported with its shaft 42 in end bearings 44 which are in the form of rockers swingably mounted on pivots 46 in the uprights 40 of the frame 22 (FIG. 3). Cooperating with each end bearing 44 is a miscut cam or eccentric 48 on a shaft 50 which is journalled in suitable bearing brackets 52 on the frame 22, with each end bearing 44 carrying a rotatable roller 54, and a return spring 56 holding each end bearing 44 with its roller 54 in follower relation with the respective miscut eccentric 48. The lower or miscut drum 28 is in this instance shown in cut relation with the upper drum 26 in which the pivoted end bearings 44 are with their rollers 54 in follower relation with the high portions of the miscut eccentrics 48. Preferably, the end bearings 44 of the lower drum 28 are identical and their pivot supports 46 have a common axis $xp$ which extends parallel to the drum axes $x$, and the miscut eccentrics 48 have the same effective radii and also extend with their common axis $xe$ parallel to the drum axes $x$.

The shear drive 34 includes the drum shafts 36 and 42, gears 66 and 68 of one-to-one gear ratio on the respective drum shafts 36 and 42, and provisions (not shown) for driving the gears 66 and 68 at their one-to-one gear ratio when in and out of mesh with each other. The shear drive 34 further includes shaft 50 of the miscut eccentrics 48, and a variable drive connection (not shown) between a power shaft and the "miscut" shaft 50 for the drive of the latter to provide cut action of the drums 26, 28 after a variable number of miscut actions of the lower drum 28. The shear described so far is conventional and forms no part of the present invention except insofar as it enters into combination therewith.

While the exemplary shear 20 could have straight shear blades 30 and 32 which extend with their cutting edges parallel to the axes x of their respective drums 26 and 28, it is greatly preferred to provide these shear blades 30 and 32 as helical blades, as shown. Further, the present shear with its helical shear blades 30 and 32 is constructed to lend itself to cutting equally well stock of most any kind, including paper and particularly metal of any hardness, with numerous advantages to boot. Such construction of the shear to that end involves primarily cutting coordination of the companion shear blades over their lengths and the mount of the latter on their respective drums, besides other considerations.

Insofar as cutting coordination of the helical companion shear blades over their lengths is concerned, such is not achieved by adjustment of one of the blades in its mount on the associated drum, but is achieved by sole adjustment of this one drum itself to bring its fixed and non-adjustable helical blade thereon into cutting coordination with the other helical blade. Involved in such adjustment of one of the drums is bodily adjustable of the same in transverse, and particularly in two transverse, directions of which one is to and from the axis of the other drum.

For bodily adjustment of the lower drum 28 in the two mentioned transverse directions, provisions are made for so bodily adjusting in these transverse directions the end bearings 44 of this lower drum 28 in the shear frame 22, and more particularly for so adjusting them at their sole supports in the shear frame, i.e., at their pivot supports 46 and their associated miscut eccentrics 48. To this end, and for adjustability of the lower drum 28 in one of the two transverse directions, the pivot 46 for each end bearing 44 has opposite end journals 90 rotatably mounted in the respective frame upright 40, and an intermediate eccentric formation 92 on which the end bearing 44 is swingable (FIGS. 2 and 3), and this pivot 46 further has an exemplary square head 94 accessible with a wrench for angular adjustment of the pivot and ensuing adjustment of the end bearing 44 and lower drum 28 in one of the mentioned transverse directions, i.e., to and from the plane in which the drum axes x, x lie. Once adjusted, the pivot 46 is locked in position by any suitable means, such as a plug 96 received in a bore 98 in the frame upright 40 and tightened against one of the end journals 90 of the pivot by a screw 100 (FIG. 4).

For adjustability of the lower drum 28 in the other of the two transverse directions, being to and from the axis of the upper drum 26, the part 102 of the stud 104 in each end bearing 44 on which the roller 54 is turnable is an eccentric formation (FIG. 3), with the stud being angularly adjustable for adjustability of the end bearing 44 and lower drum 28 in the last mentioned transverse direction, and the adjusted stud being locked in position by any suitable means, such as those shown in FIG. 4, for example.

Adjustment of the lower drum 28 in the two transverse directions for precise cutting coordination of the companion blades 30 and 32 is achieved with particular ease as well as rapidity, by first adjusting, for example, one of the pivots 46 to bring only the nearby end of the lower blade 32 into precise cutting coordination with the adjacent end of the upper blade 30 in a direction substantially normal to the plane in which the drum axes x, x lie, and then adjusting the other pivot 46 to bring only the nearby end of the lower blade 32 into the same precise cutting coordination with the adjacent end of the upper blade 30 in the same direction. Thus, with these two simple pivot adjustments the companion blades 30, 32 are throughout their entire lengths brought into precise cutting coordination in one of the transverse directions even though the pivot adjustments are gauged only with reference to the adjacent ends of the blades. Instrumental in achieving this is the mount described hereinafter of the helical blades 30 and 32 on their drums which easily maintains the blades in exact helical disposition without the slightest deviation therefrom.

Having completed the adjustment of the pivots 46 for precise cutting coordination of the companion blades 30, 32 in the one transverse direction, the lower drum 28 is adjusted in the other transverse direction for precise cutting coordination of these blades throughout their lengths. This is achieved with the same ease and rapidity by first adjusting the roller stud 104 in one of the end bearings 44 with reference only to the nearby ends of the blades, and then adjusting the roller stud in the other end bearing 44 also with reference to the nearby ends only of the blades, as will be readily understood. Also since adjustment of the lower drum in either of the two transverse directions is for all practical purposes at right angles to the drum adjustment in the other transverse direction, adjustment of the drum in either of these directions will in nowise change the finished drum adjustment in the other of these directions.

As mentioned earlier, the mount of the helical companion shear blades 30, 32 on their drums 26 and 28 is one of the constructional features of the present shear which adapts the latter to cutting any kind of stock, and particularly metal stock. Thus, each of the blades 30 and 32 is, first of all, mounted directly to its drum 26 and 28 and without any adjustment intermediary, and is further mounted so firmly as to be for all practical purposes an integral part of its drum. To this end, the drum 26 has a shoulder 140 leading to the drum periphery, and a bottom rest 142 diverging from the shoulder 140, and the other drum 28 has a similar shoulder 144 and bottom rest 146 (FIGS. 1 and 5). The blades 30 and 32 are adapted to be located with their front faces 86 and 84 on the shoulders 140 and 144 of the respective drums 26 and 28 which determine the helical disposition of the blades, and these shoulders 140 and 144 are to this end machined in the drums 26 and 28 to extend with high accuracy helically at the same uniform helix angle throughout the length of the respective drums, with these shoulders 140 and 144 extending in opposite helical directions for progressive cut or shear cooperation between the blades 30 and 32 thereon (FIG. 1). The bottom rests 142 and 146 are also machined in the respective drums 26 and 28 and serve to locate the blades 30 and 32 with their bottom surfaces 148 and 150 on these drums (FIG. 5). The shear blade 30 has two series of longitudinally spaced holes 152 and 154, of which the holes 152 are in substantial alignment with tapped holes 156 in the shoulder 140 of the drum 26 when the blade is located on this shoulder 140 and on the bottom rest 142 of this drum, with bolts 158 extending through the holes 152 and being received in the tapped holes 156 for firmly clamping the blade to shoulder 140 (see also FIG. 1). Each of the other holes 154 in the blade 30 serves for the reception of a finger 160 at one end of a bracket 162 which with its other end 164 rests on another machined drum surface 166 continuing from the bottom rest 142 to the drum periphery, with a bolt 168, which extends through a hole 170 in the bracket 162 and is received in a tapped hole 172 in the drum surface 166, being tightened to draw and hold blade 30 with its bottom surface 148 firmly against the bottom rest 142 on the drum (see also FIG. 1). The other lower, blade 32 is mounted in the same manner on the drum 28, and the same mounting provisions for the upper blade 30 on its drum 26 are used in mounting the blade 32 on its drum, with the mounting provisions for the lower blade 32 being designated by the same reference numerals as those for the upper blade with the prefix a added, however.

In accordance with another aspect of the present invention, each of the blades 30 and 32 is of parallelogram shape in cross-section. Thus, the bottom surface 148 of blade 30 extends parallel to the slanting top surface 176 which at its junction with the front face 86 forms the cutting edge 78. Similarly, the bottom surface 150 of the other blade 32 extends parallel to the slanting top surface 178 which at its junction with the front face 84 forms the cutting edge 80. The bottom rests 142 and 146 on the drums 26 and 28 slant the same as, and are in form-fit with, the bottom surfaces 148 and 150 thereon of the respective blades 30 and 32 when the latter are also located on the shoulders 140 and 144 of the respective drums 26 and 28 (FIG. 5). With this arrangement, each blade 30 or 32 may be removed from its drum and resharpened by uniform machining of its front face 86 or 84, not just once but as many times as desired, yet the cutting edge of the resharpened blade will, on each remounting of the latter on its drum, be returned exactly to its former spaced or overlap cut relation with the other blade, as will be readily understood. The same holds true if either blade is replaced with another identical blade. Since on each resharpening of either blade in the described manner and remounting of the resharpened blade on its drum, the holes in the blade, for instance the holes 152 in blade 30 on drum 28, will be displaced ever so slightly outwardly toward the drum periphery, these holes 152 are sufficiently large to receive the bolts 158 with clearance and permit their reception in the tapped holes 156 in the drum shoulder 140 no matter how many times the blade is resharpened.

Accurate location of the blades in precise helical disposition on the drums for their equally precise progressive cut or shear cooperation in operation of the shear, is thus built into the shear and is unfailingly achieved on merely mounting the blades on their drums. Also, mounting the blades on their drums involves merely the application and tightening of bolts which requires hardly any skill, yet accurate location of the blades on their drums is inevitable on mere tightening of these bolts.

The companion blades 30 and 32 are preferably and advantageously hard steel blades for cutting not only soft stock such as paper, for instance, but especially hard metal stock, including steel. Preferably, the cutting edges 78 and 80 of the blades 30 and 32 are formed by very hard inserts 180 and 182 in these blades.

The ready and highly accurate, as well as very firm, mount of the companion shear blades on the drums in very precise helical disposition thereon for their equally precise progressive cut or shear cooperation in operation of the shear, and the facile and compact adjustment of the lower drum for most accurate blade cutting coordination, are the prime factors which enable the shear to cut stock of any kind, including the hardest metals, with all the advantages springing from the use of helical blades. These same factors, coupled with the preferred very hard cutting edges of both companion blades, also account for much longer use of these blades before requiring resharpening. In this connection, it is known that in rotary "metal" shears with straight companion blades, of which one blade is adjustably mounted on its drum for blade cutting coordination, the blades require resharpening after each eight hour operation of the shear on the average, while in the present shear with helical companion blades and in cutting the same metal stock, the blades were resharpened only at the end of a full work week during which the shear was in operation for almost twenty-four hours a day, yet they were thus resharpened at the end of a full work week only because of the convenience to do so at that time rather than in the middle of a productive work day, for these blades would have cut satisfactorily for about another half week before requiring resharpening.

In accordance with another aspect of the present invention, each blade may have two cutting edges for alternative use. Thus, in the shear of FIG. 6, the blade 32' on the lower drum 28' has diagonally opposite cutting edges 80' and 80" of which the edge 80' is formed at the junction of the front face 84' and slanting top surface 178' of the blade, and the other cutting edge 88" is formed at the junction of the rear face 186 and slanting bottom surface 150' of the blade, with the slanting top and bottom surfaces 178' and 150' being preferably also parallel to each other and to the also slanting bottom rest 146' on the drum so that the bottom surface 150' of the blade is in formfit with this bottom rest when the blade is located on the latter and also on the drum shoulder 144'. Further, the holes 152a' and preferably also the holes 154a' in the blade, for the reception of the bolts 158a' and fingers 160a' of the brackets 162a' are equally spaced inwardly from the opposite cutting edges 80' and 80" for application of the blade to the drum with either cutting edge in cut position thereon.

While in the described shear much preferred helical companion shear blades are used, the same may obviously be provided with straight companion blades if such should be desired for any specific reason. Also, while the described important advantages in the respects of cutting stock of any kind, including metal, with helical shear blades, long-time use of the blades before requiring resharpening, and easy and quick, as well as highly accurate, cutting coordination of the blades, are secured in the present shear of exemplary miscut type, these same advantages are as fully secured in a rotary shear featuring similar adjustability of one drum and similar blade mounts on the drums, but being of non-miscut type. In this connection, even the exemplary shear shown would be such a non-miscut shear if the same were devoid of miscut eccentrics and the follower rollers on the end bearings of the lower drum would, instead, rest on fixed surfaces of the shear frame.

What is claimed is:

1. A drum assembly for a rotary shear, comprising a drum having diverging surfaces of which one surface is a machined shoulder leading to the drum periphery and extending longitudinally of the drum, and the other surface is a machined bottom rest forming with said shoulder a uniform obtuse angle throughout, a shear blade with a front face and top and bottom surfaces and a cutting edge at the junction of said front face and top surface, with said top and bottom surfaces being parallel and slanting from said front face so that said bottom surface, when located at said bottom rest, is in form-fit with the latter throughout when said front face rests flush on said shoulder, and means removably clamping said blade to said drum with its front face and bottom surface resting against said shoulder and bottom rest, respectively.

2. A drum assembly as in claim 1, in which said shoulder extends helically of the drum.

3. A drum assembly as in claim 1, in which said blade has also a rear face parallel to said front face thereof, and another cutting edge at the junction of said rear face and bottom surface, and said clamping means removably secure said blade to said drum with either said front face and bottom surface or said rear face and top surface resting on said shoulder and bottom rest, respectively.

4. A drum assembly as in claim 3, in which said shoulder extends helically of the drum.

5. A drum assembly as in claim 3, in which said blade has longitudinally spaced first holes equally spaced from said cutting edges, and said drum shoulder has first tapped holes in alignment with said holes in the blade when the latter is with either face and slanting surface thereof located on said shoulder and bottom rest, respectively, of the drum, and there are provided bolts extending through said blade holes with clearance and received in said tapped holes in clamping the blade to said shoulder in location of the blade thereon and on the bottom rest of the drum.

6. A drum assembly as in claim 5, in which said drum has another machined surface leading from said bottom rest to the drum periphery and extending substantially normal to said shoulder and having second tapped holes, said blade has longitudinally spaced second holes equally spaced from said cutting edges, and there are further provided brackets each having diverging first and second legs of which said first leg has an intermediate hole and a finger end, with said second tapped holes being aligned with said holes in said brackets when said finger ends thereof project into said second holes in said blade in its location on said drum shoulder and bottom rest, and said second legs thereof rest on said other machined drum surface, and second bolts extending through said bracket holes and being received by said second tapped holes and tightened for clamping the blade with either slanting surface thereof to said bottom rest.

References Cited

UNITED STATES PATENTS

| | | | |
|---|---|---|---|
| 2,180,204 | 11/1939 | Hallden | 83—674 |
| 2,751,006 | 6/1956 | Lane | 83—674 |
| 3,084,582 | 4/1963 | Anderson | 83—674X |

FRANK T. YOST, Primary Examiner

U.S. Cl. X.R.

83—342, 699